US012694136B2

(12) United States Patent
Uretzky et al.

(10) Patent No.: US 12,694,136 B2
(45) Date of Patent: Jul. 28, 2026

(54) UNAUTHORIZED ACCESS DETERMINATION BASED ON BURST INPUT/OUTPUT INDICATORS OR NETWORK ACTIVITY SCORES

(71) Applicant: HEWLETT PACKARD ENTERPRISE DEVELOPMENT LP, Spring, TX (US)

(72) Inventors: Omer Uretzky, Herzliya (IL); Gil Barash, Herzliya (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 86 days.

(21) Appl. No.: 18/928,331

(22) Filed: Oct. 28, 2024

(65) Prior Publication Data

US 2026/0119680 A1    Apr. 30, 2026

(51) Int. Cl.
| | |
|---|---|
| *G06F 21/60* | (2013.01) |
| *G06F 13/28* | (2006.01) |
| *G06F 21/52* | (2013.01) |
| *G06F 21/55* | (2013.01) |
| *G06F 21/56* | (2013.01) |

(Continued)

(52) U.S. Cl.
CPC ............ *G06F 21/602* (2013.01); *G06F 13/28* (2013.01); *G06F 21/52* (2013.01); *G06F 21/55* (2013.01); *G06F 21/552* (2013.01); *G06F 21/554* (2013.01); *G06F 21/566* (2013.01); *G06F 21/568* (2013.01); *G06F 21/6218* (2013.01); *H04L 63/1408* (2013.01); *H04L 63/1416* (2013.01); *H04L 63/1425* (2013.01)

(58) Field of Classification Search
CPC ............. H04L 63/1425; H04L 63/1416; H04L 63/1408; G06F 21/554; G06F 21/566; G06F 21/552; G06F 21/6218; G06F 21/568; G06F 21/52; G06F 21/55; G06F 21/602; G06F 2221/2107; G06F 13/28
See application file for complete search history.

(56) References Cited

U.S. PATENT DOCUMENTS

| | | | | |
|---|---|---|---|---|
| 10,503,897 | B1 * | 12/2019 | Striem-Amit | ......... G06F 21/552 |
| 2017/0070518 | A1 * | 3/2017 | Manadhata | ......... H04L 63/1416 |

(Continued)

OTHER PUBLICATIONS

Aardvark Infinity. "File Fragmentation Exfiltration: Breaking Data into Small Pieces to Avoid Detection", Aug. 2024. Retrieved from <https://medium.com/aardvark-infinity/file-fragmentation-exfiltration-breaking-data-into-small-pieces-to-avoid-detection-2e469f47388a>. (Year: 2024).*

(Continued)

*Primary Examiner* — Michael Simitoski
(74) *Attorney, Agent, or Firm* — Trop, Pruner & Hu, P.C.

(57) ABSTRACT

In some examples, a system computes read burst indicators of read input/output (I/O) bursts to a storage system at respective time points, and computes encryption burst indicators of encryption I/O bursts at the respective time points. The system calculates a score based on the read burst indicators, the encryption burst indicators, and a distance factor that is based on a time distance between when a burst read I/O burst of the read I/O bursts occurred and when an encryption I/O burst of the encryption I/O bursts occurred. The system determines whether unauthorized access of a computing environment is occurring based on the score.

20 Claims, 5 Drawing Sheets

(51) Int. Cl.
*G06F 21/62* (2013.01)
*H04L 9/40* (2022.01)

(56) References Cited

U.S. PATENT DOCUMENTS

| | | | | |
|---|---|---|---|---|
| 2017/0359370 | A1* | 12/2017 | Humphries | G06F 21/6218 |
| 2020/0036747 | A1* | 1/2020 | Humphries | H04L 63/10 |
| 2020/0082109 | A1* | 3/2020 | Kallos | G06N 3/045 |
| 2020/0159947 | A1* | 5/2020 | Shenefiel | H04L 63/1425 |
| 2020/0358792 | A1* | 11/2020 | Bazalgette | G06N 20/00 |
| 2021/0173930 | A1* | 6/2021 | Dahal | H04L 63/145 |
| 2021/0216625 | A1* | 7/2021 | Miller | G06F 21/602 |
| 2021/0258325 | A1* | 8/2021 | Meyer | H04L 61/4511 |
| 2022/0092180 | A1* | 3/2022 | Richardson | G06F 11/108 |
| 2023/0060606 | A1* | 3/2023 | Dubey | G06F 11/076 |
| 2023/0273997 | A1* | 8/2023 | Lifshitz | G06F 21/565 |
| | | | | 726/23 |
| 2024/0012912 | A1* | 1/2024 | Zhang | H04L 41/16 |
| 2024/0013067 | A1* | 1/2024 | Azarafrooz | G06F 21/602 |
| 2024/0056460 | A1* | 2/2024 | Yadav | H04L 63/1416 |
| 2024/0086532 | A1* | 3/2024 | Das | G06F 21/564 |
| 2025/0190558 | A1* | 6/2025 | Cosentino | G06F 21/554 |
| 2025/0363227 | A1* | 11/2025 | Mojica | G06F 11/1458 |

OTHER PUBLICATIONS

Baek, SungHa, et al. "SSD-insider: Internal defense of solid-state drive against ransomware with perfect data recovery." 2018 IEEE 38th International conference on distributed computing systems (ICDCS). IEEE, 2018. (Year: 2018).*

Hawkins, Brian, et al. "Adaptive Behavioral Signature Extraction for Enhanced Ransomware Detection Using Dynamic File Activity Profiling." Authorea Preprints (2024). (Year: 2024).*

Kardile, Ashwini Balkrushna. "Crypto ransomware analysis and detection using process monitor." (2017). (Year: 2017).*

Kharaz, Amin, et al. "{Unveil}: A {Large-Scale}, automated approach to detecting ransomware." 25th USENIX security symposium (USENIX Security 16). 2016. (Year: 2016).*

Kharraz, Amin, and Engin Kirda. "Redemption: Real-time protection against ransomware at end-hosts." International Symposium on Research in Attacks, Intrusions, and Defenses. Cham: Springer International Publishing, 2017. (Year: 2017).*

Kosto, Villian, et al. "Automated behavior sequencing framework for real-time ransomware detection via temporal execution patterns." (2024). (Year: 2024).*

Mehnaz, Shagufta, Anand Mudgerikar, and Elisa Bertino. "Rwguard: A real-time detection system against cryptographic ransomware." International symposium on research in attacks, intrusions, and defenses. Cham: Springer International Publishing, 2018. (Year: 2018).*

Min, Donghyun, et al. "A content-based ransomware detection and backup solid-state drive for ransomware defense." IEEE Transactions on Computer-Aided Design of Integrated Circuits and Systems 41.7 (2021): 2038-2051. (Year: 2021).*

Mir, Waqar Hassan, Neeraj Goel, and Venkata Kalyan Tavva. "CARDR: DRAM Cache Assisted Ransomware Detection and Recovery in SSDs." Proceedings of the International Symposium on Memory Systems. 2024. (Year: 2024).*

Paik, Joon-Young, et al. "A storage-level detection mechanism against crypto-ransomware." Proceedings of the 2018 ACM SIGSAC Conference on Computer and Communications Security. 2018. (Year: 2018).*

Scaife, Nolen, et al. "Cryptolock (and drop it): stopping ransomware attacks on user data." 2016 IEEE 36th international conference on distributed computing systems (ICDCS). IEEE, 2016. (Year: 2016).*

Slowik, Joe. "Hold the Door: Examining Exfiltration Activity and Applying Countermeasures", Jun. 2021. Retrieved from <https://blog.gigamon.com/2021/06/17/hold-the-door-examining-exfiltration-activity-and-applying-countermeasures/>. (Year: 2021).*

Tang, Fei, et al. "RansomSpector: An introspection-based approach to detect crypto ransomware." Computers & Security 97 (2020) : 101997. (Year: 2020).*

Wang, Zhongyu, et al. "Ransom access memories: Achieving practical ransomware protection in cloud with {DeftPunk}." 18th USENIX Symposium on Operating Systems Design and Implementation (OSDI 24). 2024. (Year: 2024).*

Welderman, Grant, et al. "A robust system for ransomware detection using temporal behavior modeling." Authorea Preprints (2024). (Year: 2024).*

Xie, Wen, Niusen Chen, and Bo Chen. "Poster: Incorporating Malware Detection into Flash Translation Layer." Reading 1.8 (2020): 15. (Year: 2020).*

Aslan et al., A Review of Cloud-Based Malware Detection System: Opportunities, Advances and Challenges, Mar. 2021 (8 pages).

Axis Security, About Axis downloaded Dec. 26, 23 (4 pages).

Axis Security, Axis Security ZTNA Solution Versus VPN downloaded Dec. 26, 2023 (6 pages).

Barash et al., U.S. Appl. No. 18/495,142 entitled File System Operations in Storage Devices filed Oct. 26, 2023 (32 pages).

Fortra's Data Classification Suite downloaded Dec. 26, 2023 (6 pages).

Gagulic et al., Ransomware Detection with Machine Learning in Storage Systems, Feb. 13, 2023 (114 pages).

Gaspari et al., Reliable detection of compressed and encrypted data, Jul. 24, 2022 (15 pages).

Hardesty, L.; "Explained: Neural networks"; MIT News; Apr. 14, 2017; 7 pages.

HPE Aruba, HPE Aruba Networking ClearPass network access control downloaded Sep. 17, 2024 (7 pages).

Kost, Upguard, How to Detect Data Exfiltration (Before It's Too Late), Feb. 16, 2023 (12 pages).

Min et al., A Content-Based Ransomware Detection and Backup Solid-State Drive for Ransomware Defense, Jul. 2022 (14 page.

Next Labs, Understanding Data Classification downloaded Dec. 26, 2023 (7 pages).

Pham, Blumira, How to Detect Data Exfiltration, Nov. 22, 2022 (8 pages).

Uretzky et al., U.S. Appl. No. 18/418,548 entitled Intermittent Encryption Attack filed Jan. 22, 2024 (32 pages).

Uretzky et al., U.S. Appl. No. 18/418,551 entitled Access Control Based On Classification of Changed Data filed Jan. 22, 2024 (33 pages).

Venefi, "Study: Seventy-four Percent of IT Decision Makers Say New Extortion Tactics Make Ransomware a National Security Threat", available online at <https://venafi.com/news-center/press-release/study-seventy-four-percent-it-decision-makers-say-new-extortion-tactics/>, Feb. 24, 2022, 6 page.

Wikipedia, Data compression downloaded Oct. 11, 2024 (19 pages).

Wikipedia, Encryption downloaded Oct. 11, 2024 (10 pages).

Wikipedia, Entropy (information theory) downloaded Jan. 3, 2024 (19 pages).

Zerto, CDP downloaded Dec. 13, 2023 (2 pages).

Zerto, How Does True Continuous Data Protection (CDP) Work? Jul. 25, 2022 (5 pages).

Zhou et al., Limits of I/O Based Ransomware Detection: An Imitation Based Attack, May 2023 (18 pages).

* cited by examiner

400

500

UNAUTHORIZED ACCESS DETERMINATION BASED ON BURST INPUT/OUTPUT INDICATORS OR NETWORK ACTIVITY SCORES

BACKGROUND

A ransomware attack involves encrypting data on a computer or on multiple computers connected over a network. In a ransomware attack, data can be encrypted using an encryption key, which renders the data inaccessible to users unless a ransom is paid to obtain the encryption key. The ransomware attack can also exfiltrate data. A ransomware attack can be highly disruptive to enterprises, including businesses, government agencies, educational organizations, individuals, and so forth.

BRIEF DESCRIPTION OF THE DRAWINGS

Some implementations of the present disclosure are described with respect to the following figures.

Figure 1:
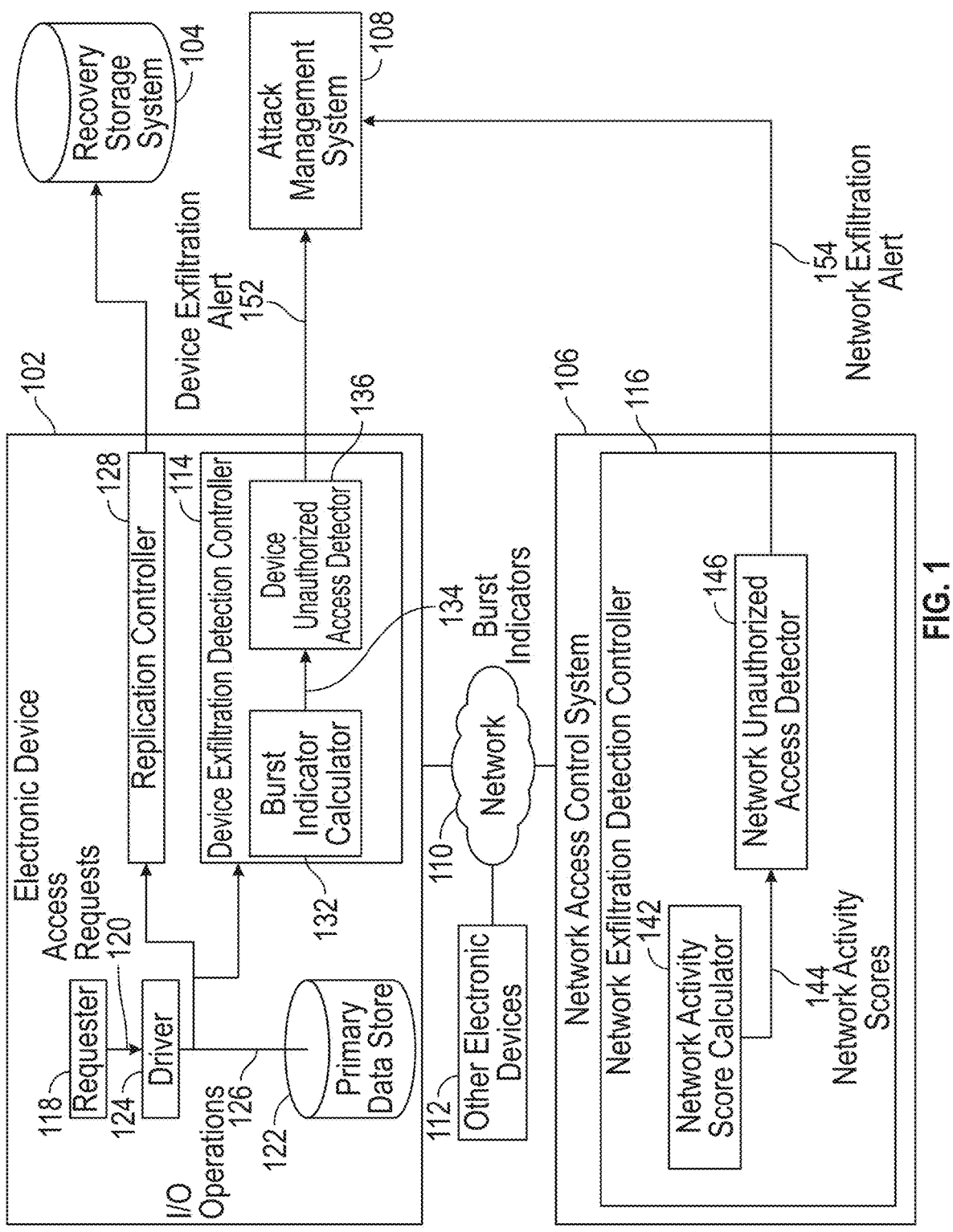
FIG. 1 is a block diagram of an arrangement including electronic devices connected to a network, a network access control system, and an attack management system, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A double-extortion ransomware attack may exfiltrate a victim's data and additionally encrypt the data. The attacker then demands payment of a ransom in return for the encryption key to decrypt the encrypted data. The attacker also threatens to disclose the data publicly if the ransom is not paid. As a result, even if the victim can recover the encrypted data, such as from a data backup system, the threat of public disclosure of the data (some of which may be sensitive or confidential) may be sufficient leverage to prompt the victim to pay the ransom.

Some ransomware protection systems may be able to detect a ransomware attack based on detecting that unauthorized encryption of data is occurring. However, by the time a ransomware attack is detected based on the detection of data encryption, the attacker may already have retrieved (exfiltrated) the data for possible public exposure. Note that data exfiltration by the attacker occurs before the attacker encrypts the data. Thus, ransomware protection systems or techniques that detect a ransomware attack and that can recover original data do not protect against the exfiltration of the data by an attacker.

In accordance with some implementations of the present disclosure, a data protection system can detect an unauthorized access of data in a computing environment based on computing burst indicators relating to input/output (I/O) operations to a storage system and/or network activity scores relating to activities over a network of the computing environment. The unauthorized access of data (data exfiltration) can be part of a ransomware attack attempting to exfiltrate data. In other examples, the unauthorized access of data (data exfiltration) can be part of other types of unauthorized activities by attackers or other unauthorized entities. The computed burst indicators include any or some combination of the following: read burst indicators of read I/O bursts that read data of a storage system, compression burst indicators of compression I/O bursts that compress data, fragmentation burst indicators of fragmentation I/O bursts that fragment data, or encryption burst indicators of encryption I/O bursts that encrypt data. The data protection system calculates a burst-related attack score based on some combination of the read burst indicators, the compression burst indicators, the fragmentation burst indicators, and the encryption burst indicators. The burst-related attack score is calculated further based on distance factors that are based on time distances between some combination of the occurrences of the read I/O bursts, the compression I/O bursts, the fragmentation I/O bursts, and the encryption I/O bursts.

In further examples, the computed network activity scores include any or some combination of the following: an encryption activity score representing transfers of encrypted objects over a network; a small object activity score representing transfers of small objects with sizes less than a size threshold over the network; a data rate spike score representing a data rate spike in transfers of objects over the network; or an irregular communication score based on one or more of identifying one or more external target systems to which the encrypted objects are sent (potentially over multiple communication channels), and/or identifying a communication protocol used to transmit the encrypted. The data protection system calculates a network-related attack score based on some combination of the encryption activity score, the small object activity score, the data rate spike score, and the irregular communication score. The network-related attack score is further based on a proximity factor relating to a time proximity between some combination of a transfer of encrypted objects, a transfer of small objects, a data rate spike, and an irregular communication.

Based on detecting a potential data exfiltration, the data protection system can take remediation action to prevent further unauthorized access of a computing environment, to prevent damage to the computing environment and/or to prevent loss or theft of data. Electronic devices may be disabled, and network traffic may be blocked.

FIG. 1 is a block diagram of an example arrangement including an electronic device 102, a recovery storage system 104, a network access control system 106, and an attack management system 108, according to some examples. Each of the network access control system 106 and the attack management system 108 can be implemented using one or more computers. In other examples, the network access control system 106 and the attack management system 108 can be integrated into one system.

The electronic device 102 is connected to a network 110, such as a local area network (LAN), a wide area network (WAN), or another type of network. Other electronic devices 112 are also connected to the network 110. Electronic devices connected to the network 110 can perform network communications over the network 110.

The network access control system 106 is responsible for managing access to the network 110 by clients such as the electronic devices 102 and 112 as well as other clients. The network access control system 106 can implement access control policies that identify which clients have permission to access the network 110, specify the type of communications allowed by the entities over the network 110, and specify resources that may be accessed by the clients.

In accordance with some examples of the present disclosure, the electronic device 102 includes a device exfiltration detection controller 114 to detect data exfiltration based on I/O operations 126 of the electronic device 102. The network access control system 106 includes a network exfiltration detection controller 116 to detect data exfiltration based on network activities over the network 110. In other examples, the network exfiltration detection controller 116 may be part of the electronic device 102 or in another system separate from the network access control system 106.

Although FIG. 1 shows the device exfiltration detection controller 114 and the network exfiltration detection controller 116 as separate controllers, in other examples, the controllers 114 and 116 may be integrated into one controller. Alternatively, one of the device exfiltration detection controller 114 and the network exfiltration detection controller 116 may be omitted.

The electronic device 102 includes a requester 118 that can issue access requests 120 (read requests and write requests) to read data from a primary data store 122 or write data to the primary data store 122. The primary data store 122 is a data store for storing data used in operations of the requester 118, such as when the requester 118 is executing workloads of application programs, an operating system (OS), or other programs. An example of the requester 118 is a virtual compute entity, such as a virtual machine (VM) or a container. In other examples, the requester 118 can include a program or a hardware component. Although just one requester is shown in FIG. 1, in other examples, there may be multiple requesters that can access data of the primary data store 122.

The access requests 120 (from one or more requesters) are received by a driver 124, which generates the I/O operations 126 based on the access requests 120. The I/O operations 126 include read I/O operations to read data of the primary data store 122 and write block I/O operations to write data to the primary data store 122. The driver 124 is an entity that manages access of the primary data store 122. In some examples, the driver 124 may be part of a hypervisor that creates and manages VMs. In other examples, the driver 124 may be part of the OS of the electronic device 102.

The electronic device 102 further includes a replication controller 128 that replicates write I/O operations to the recovery storage system 104. In some examples, the write I/O operations are replicated to entries of a journal stored in the recovery storage system 104. A "journal" can refer to a data structure that logs write I/O operations that modify data items in the primary data store 122. A write I/O operation can update data, add new data, or delete existing data in the primary data store 122. Replicating a write I/O operation to an entry of the journal can refer to adding information representing the write I/O operation to the entry of the journal. At some later time, entries of the journal may be applied to a backup data store (not shown) that stores copies of the primary data store 122.

In some examples, the replication controller 128 and the device exfiltration detection controller 114 are separate controllers. In other examples, the replication controller 128 and the device exfiltration detection controller 114 may be integrated into one controller.

The device exfiltration detection controller 114 includes a burst indicator calculator 132 that calculates burst indicators 134. The burst indicators 134 are provided by the burst indicator calculator 132 to a device unauthorized access detector 136 in the device exfiltration detection controller 114. The burst indicator calculator 132 and the device unauthorized access detector 136 can be implemented using hardware processing circuitry of the device exfiltration detection controller 114, or with machine-readable instructions executable by the device exfiltration detection controller 114.

The device unauthorized access detector 136 can make a determination of whether data exfiltration is occurring based on the burst indicators 134. If the device unauthorized access detector 136 determines that data exfiltration is occurring based on the burst indicators 134, the device unauthorized access detector 136 can send a device exfiltration alert 152 to the attack management system 108. An "alert" can include a message or an information element.

The burst indicators 134 produced by the burst indicator calculator 132 can represent various I/O bursts that make up a data exfiltration pattern, such as the following example data exfiltration pattern. After an unauthorized entity (e.g., the requester 118 or another requester) has identified data within a computing environment to exfiltrate, the unauthorized entity can perform the access of the identified data in a manner that seeks to avoid detection by a data protection system. Examples of data of interest to the unauthorized entity may include personally identifiable information (PII) (e.g., birthdates, social security numbers, etc.), financial records, intellectual property, trade secrets, or other sensitive or confidential data.

The data exfiltration pattern may start with a read I/O burst to read data from a storage system, where a read I/O burst can include a high concentration of read I/O operations in a short time duration. An "I/O burst" is present if the data protection system detects that a quantity of I/O operations per specified time duration exceeds a rate threshold, where the rate threshold may be statically or dynamically set.

The data exfiltration pattern may further include a compression I/O burst that includes a high concentration of compression I/O operations that compress data per specified time duration. Data compression uses a compression algorithm (e.g., a Lempel-Ziv algorithm, a Huffman Coding algorithm, etc.) applied on data to reduce the size of the data. The compression I/O burst may follow a read I/O burst.

In some cases, following a compression I/O burst, the data exfiltration pattern may include a fragmentation I/O burst, in which data objects (e.g., files, images, videos, etc.) are divided into smaller fragments. The fragmentation I/O burst includes a high concentration of fragmentation I/O operations that fragment data per specified time duration. Fragmenting compressed data objects reduces the data into small chunks that may evade detection by a data protection system such as an intrusion detection system (IDS) or a data loss prevention (DLP) system.

Following the fragmentation I/O burst, the data exfiltration pattern may further include an encryption I/O burst. The encryption I/O burst includes a high concentration of encryption I/O operations that encrypt data per specified time duration. Data encryption uses an encryption algorithm (e.g., a symmetric key encryption algorithm, a public key encryption algorithm, etc.) to transform data into a different encoded form. Compressing and encrypting data as part of the data exfiltration can reduce the likelihood of detecting the data exfiltration, since a smaller amount of data is transmitted, and the encrypted data may prevent analysis of the data.

The data exfiltration pattern may further include a transmission of the compressed, fragmented, and encrypted data to an external target system that is outside the computing environment, possibly over multiple communication channels (e.g., multiple communication sessions established with one or more external target systems). An external target system may include a command and control (C&C) server, a website, a peer-to-peer network, or any other type of system. Further, the transmission of exfiltrated data may employ a communication protocol (referred to as an "unexpected communication protocol") that differs from typical communication protocols (referred to as "expected communication protocols"). For example, the majority of communications of devices in the computing environment may be according to one or more of the following protocols: Hypertext Transfer Protocol (HTTP), Remote Desktop Protocol (RDP), or Secure Shell (SSH) Protocol. In such examples, the expected communication protocols include HTTP, RDP, and SSH.

In contrast, an unauthorized entity during data exfiltration may use the File Transfer Protocol (FTP) or another protocol ("unexpected communication protocol") that differs from the above expected communication protocols. The transmission of data to the external target system or that uses an unexpected communication protocol are further indications of data exfiltration, particularly when combined with the data exfiltration pattern that includes a read I/O burst, followed by a compression I/O burst, followed by a fragmentation I/O burst, and followed an encryption I/O burst (i.e., a sequence that includes a read I/O burst, a compression I/O burst, a fragmentation I/O burst, and an encryption I/O burst).

In other example, a data exfiltration pattern may use a different order of the different types of I/O bursts. In further examples, a data exfiltration pattern may omit some of the types of I/O bursts, or a data exfiltration pattern may include other types of I/O activities that may be detected by the device exfiltration detection controller 114.

In some examples, the burst indicators 134 include any or some combination of the following: read burst indicators of read I/O bursts to the primary data store 122, compression burst indicators of compression I/O bursts, fragmentation burst indicators of fragmentation I/O bursts, or encryption burst indicators of encryption I/O bursts.

The device unauthorized access detector 136 calculates a burst-related attack score based on some combination of the read burst indicators, the compression burst indicators, the fragmentation burst indicators, and the encryption burst indicators. The burst-related attack score can be calculated further based on distance factors that are based on time distances between some combination of the occurrences of the read I/O bursts, the compression I/O bursts, the fragmentation I/O bursts, and the encryption I/O bursts. The burst-related attack score may further be based on other factors, such as whether data is transmitted to one or more external target systems (such as over multiple communication channels) or the transmission of data uses an unexpected communication protocol.

The network exfiltration detection controller 116 includes a network activity score calculator 142 and a network unauthorized access detector 146. The network activity score calculator 142 and the network unauthorized access detector 146 can be implemented using hardware processing circuitry of the network exfiltration detection controller 116, or with machine-readable instructions executed by the network exfiltration detection controller 116.

The network activity score calculator 142 calculates network activity scores 144 that are provided to the network unauthorized access detector 146. In some examples, the network activity scores 144 include any or some combination of the following: an encryption activity score representing transfers of encrypted objects over the network 110; a small object activity score representing transfers of small objects with sizes less than a size threshold (e.g., due to data fragmentation) over the network 110; a data rate spike score representing a data rate spike in transfers of objects over the network 110; or an irregular communication score based on one or more of identifying an external target system to which the encrypted, small objects are sent, or detecting that an unexpected communication protocol is used to transmit the encrypted, small objects. The network unauthorized access detector 146 calculates a network-related attack score based on some combination of the encryption activity score, the small object activity score, the data rate spike score, and the irregular communication score. The network-related attack score is further based on a proximity factor relating to a time proximity between some combination of a transfer of encrypted objects, a transfer of small objects, a data rate spike, and an irregular communication.

If the network unauthorized access detector 146 determines that data exfiltration is occurring based on the network activity scores 144, the network unauthorized access detector 146 can send a network exfiltration alert 154 to the attack management system 108.

The attack management system 108 can assess information provided by each of the device exfiltration detection controller 114 and the network exfiltration detection controller 116 to determine whether an unauthorized exfiltration of data is in fact occurring. For example, scores may be included in the alerts 152 and 154, and the scores can be used by the attack management system 108 to assess whether it is likely that data exfiltration is occurring. If the device exfiltration detection controller 114 issued the device exfiltration alert 152 but the network exfiltration detection controller 116 did not issue the network exfiltration alert 154 (or vice versa), then the attack management system 108 may issue a notification to a user or another entity seeking further analysis.

The attack management system 108 may also initiate a remediation action in response to the device exfiltration alert 152 and/or the network exfiltration alert 154. For example, the attack management system 108 may cause the electronic device 102 to be disabled, such as by powering off the electronic device 102 or disabling programs of the electronic device 102. The attack management system 108 may additionally or alternatively disable a network connectivity of the electronic device 102. Other remediation actions that the attack management system 108 can trigger include causing the network access control system 106 to block communications of the electronic device 102 over the network 110, or updating rules of the network access control system 106 to block certain traffic, and so forth.

Burst-Related Data Exfiltration Detection

As noted above, the device unauthorized access detector 136 calculates a burst-related attack score based on some combination of the read burst indicators, the compression burst indicators, the fragmentation burst indicators, and the encryption burst indicators.

The burst indicators 134 considered by the device unauthorized access detector 136 can be included in the following vectors: Read I/O Burst (RIB[1:N]), Compressed I/O Burst (CIB[1:N]), Fragmentation I/O Burst (FIB[1:N]), and Encrypted I/O Burst (EIB[1:N]), where N is an integer greater than or equal 2 and N represents a quantity of time windows over which burst indicators are generated.

Note that the generation of burst indicators is an ongoing process in which additional burst indicators are produced for new time windows, so N can be a continually increasing for new time windows. For N corresponding time windows, the burst indicator calculator 132 produces N RIB indicators, N CIB indicators, N FIB indicators, and N EIB indicators.

RIB[i] is a read burst indicator of whether a read I/O burst was detected by the burst indicator calculator 132 in time window i (i=1 to N), CIB[i] is compression burst indicator of whether a compression I/O burst was detected by the burst indicator calculator 132 in time window i, FIB[i] is fragmentation burst indicator of whether a fragmentation I/O burst was detected by the burst indicator calculator 132 in time window i, and EIB[i] is an encryption burst indicator of whether an encryption I/O burst was detected by the burst indicator calculator 132 in time window i. The variable i is a time index.

Data compression and data encryption detection can be based on calculating entropies of data. One example of entropy that can be computed is Shannon entropy. Both compressed data and encrypted data exhibit elevated entropy. In some cases, encrypted data can have higher entropy than compressed data. In further examples, a machine learning technique, such as a neural network technique, can be used to distinguish between compressed data and encrypted data. An example of the neural network technique is described in Fabio De Gaspari et al., entitled "Reliable Detection of Compressed and Encrypted Data," dated July 2022. In other examples, other techniques can be used to distinguish between compressed data and encrypted data, such as a chi-square test technique or other techniques.

Fragmentation of data can be detected based on detecting splitting of larger data objects into smaller data objects. For example, the burst indicator calculator 132 can compare sizes of data objects input into an I/O operation with sizes of output data objects produced by the I/O operation. If the I/O operation produces output data objects that are smaller than input data objects, and if there are more output data objects than input data objects, that is indicative of data fragmentation.

A burst indicator set to a first value (e.g., "1") indicates that a respective I/O burst was detected in the corresponding time window. The burst indicator set to a different second value (e.g., "0") indicates that the respective I/O burst was not detected in the corresponding time window. More specifically, RIB[i]=1 indicates that a read I/O burst was detected in time window i, but RIB[i]=0 indicates that a read I/O burst was not detected in time window i. Similarly, CIB[i]=1 indicates that a compression I/O burst was detected in time window i, but CIB[i]=0 indicates that a compression I/O burst was not detected in time window i. FIB[i]=1 indicates that a fragmentation I/O burst was detected in time window i, but FIB[i]=0 indicates that a fragmentation I/O burst was not detected in time window i. EIB[i]=1 indicates that an encryption I/O burst was detected in time window i, but EIB[i]=0 indicates that an encryption I/O burst was not detected in time window i.

In the following discussion, reference is made to a parameter XIB[i], where X is one of R, C, F, and E to represent a respective type of I/O burst (R for read I/O burst, C for compression I/O burst, F for fragmentation I/O burst, and E for encryption I/O burst).

In some examples, the burst indicator calculator 132 sets XIB[i] to 1 or 0 based on comparing the quantity of I/O operations in time window i (the rate of I/O operations for time window i) to a rate threshold. The rate threshold may be based on an average rate of I/O operations observed over a specified time interval that is longer than the time window i. For example, if time window i is a two-minute window, then the specified time interval over which the average rate of I/O operations is determined can be a one-hour time interval. In other examples, time windows and time intervals of longer lengths may be used.

In an example, the rate threshold can be defined as follows: average rate over the specified time interval multiplied by a non-negative factor (e.g., 1.4 or some other value greater than or equal 1). In other examples, the rate threshold can be set in a different way. An I/O burst of type X is present in time window i if the rate of I/O operations in time window i (the rate is the quantity of I/O operations divided by the length of time window i) exceeds the rate threshold.

Table 1 below shows an example array of burst indicators. The RIB[i] column includes RIB[i] indicator values in time windows 1 to 5. The CIB[i] column includes CIB[i] indicator values in time windows 1 to 5. The FIB[i] column includes FIB[i] indicator values in time windows 1 to 5. The EIB[i] column includes EIB[i] indicator values in time windows 1 to 5. Although just five time windows are depicted in Table 1, it is noted that there may be more time windows with respective burst indicators set to 0 or 1.

TABLE 1

| Time index i | RIB[i] | CIB[i] | FIB[i] | EIB[i] |
|---|---|---|---|---|
| 1 | 0 | 0 | 0 | 1 |
| 2 | 1 | 0 | 0 | 0 |
| 3 | 0 | 1 | 0 | 0 |
| 4 | 0 | 0 | 0 | 0 |
| 5 | 0 | 0 | 1 | 0 |
| 6 | 0 | 0 | 0 | 1 |

In some examples, a data exfiltration pattern includes a burst of read I/O operations, followed by a burst of compression I/O operations in which the data read in the read I/O operations are compressed, followed by a burst of fragmentation I/O operations in which the compressed data is fragmented into fragments, and followed by a burst of encryption I/O operations in which the fragments are encrypted.

In Table 1 above, a read I/O burst was detected in time window 2, based on RIB[2]=1; a compression I/O burst was detected in time window 3, based on CIB[3]=1; a fragmentation I/O burst was detected in time window 5, based on FIB[5]=1, and an encryption I/O burst was detected in time window 6, based on EIB[6]=1. The foregoing approximately follows a data exfiltration pattern, even though no burst activity was detected in time window 4. Effectively, the determination of whether data exfiltration is potentially present is based on relative time orders of the read burst indicators, the compression burst indicators, the fragmentation burst indicators, and the encryption burst indicators.

Table 1 also shows that an encryption I/O burst was detected in time window 1, based on EIB[1]=1. However, this encryption I/O burst did not follow a read I/O burst, a compression I/O burst, and a fragmentation I/O burst. Thus, the encryption burst indicator in time window 1 that is earlier than time window 2 is not considered in computing the burst-related attack score for determining whether data exfiltration is potentially present.

Eq. 1 below is an example of how the device unauthorized access detector 136 computes a burst score $Score_{BURST}$ for the following sequence of burst indicators: $RIB[i_{RIB}]$, CIB $[i_{CIB}]$, $FIB[i_{FIB}]$, and $EIB[i_{EIB}]$. Note that $i_{RIB} < i_{CIB} < i_{FIB} < L_{EIB}$ based on the example data exfiltration pattern discussed. In other words, the burst score $Score_{BURST}$ is computed based on values of a read burst indicator, a compression burst indicator, a fragmentation burst indicator, and an encryption burst indicator in that sequence.

$$Score_{BURST} = (wRIB \times RIB[i_{RIB}] + wCIB \times CIB[i_{CIB}] + wFIB \times \qquad \text{(Eq. 1)}$$

$$FIB[i_{FIB}] + wEIB \times EIB[i_{EIB}]) \times \sqrt{\frac{1}{i_{EIS} - i_{RIB} - 2}}.$$

Note that Eq. 1 includes a distance factor as set forth in Eq. 2.

$$\sqrt{\frac{1}{i_{EIB} - i_{RIB} - 2}}. \qquad \text{(Eq. 1)}$$

The burst score $Score_{BURST}$ decreases as the burst events in the sequence are farther apart in time. In Eq. 2, $i_{EIB} - i_{RIB}$ represents the time space (expressed as a quantity of time windows) separating the time index $i_{EIB}$ of the encryption I/O burst from the time index $i_{RIB}$ of the read I/O burst. The farther apart the encryption I/O burst from the read I/O burst, the lower the burst score $Score_{BURST}$. In other examples, the distance factor can be computed in a different way, such as by using a standard deviation of the time indexes similar to that used in Eq. 5 further below.

Eq. 1 also includes weights wRIB, wCIB, wFIB, and wEIB for the read burst indicator, compression burst indicator, fragmentation burst indicator, and encryption burst indicator, respectively. Each weight can be a value between 0 and 1 (or another value). The value assigned to each weight may be empirically set based on analysis of historical data for determining which of the burst indicators should be weighted more heavily over other burst indicators in detecting data exfiltration.

Eq. 3 below shows how the device unauthorized access detector 136 derives a burst-related attack score $OutputScore_{BURST}$ based on iterating through the time indexes $i_{RIB}$, $i_{CIB}$, $i_{FIB}$, and $i_{EIB}$, and computing the burst score $Score_{BURST}$ of Eq. 1 in each iteration. The value of $OutputScore_{BURST}$ may be initialized to zero or another low value.

$$\text{For } i_{RIB} \in (1, N - 3): \qquad \text{(Eq. 3)}$$

$$\text{For } i_{CIB} \in (i_{RIB} + 1, N - 2):$$

$$\text{For } i_{FIB} \in (i_{CIB} + 1, N - 1):$$

$$\text{For } i_{EIB} \in (i_{FIB} + 1, N):$$

$$OutputScore_{BURST} = MAX(OutputScore_{BURST}, Score_{BURST})$$

More generally, the calculation of the burst-related attack score is based on aggregating burst indicators at respective time points in a sequence that corresponds to the data exfiltration pattern. Eqs. 1 and 3 derive the burst-related attack score based on a weighted sum of the burst indicators and selecting a maximum from among burst scores. In other examples, other types of aggregating of burst indicators can be performed, such as based on multiplying burst indicators, or other aggregation techniques.

Figure 2:
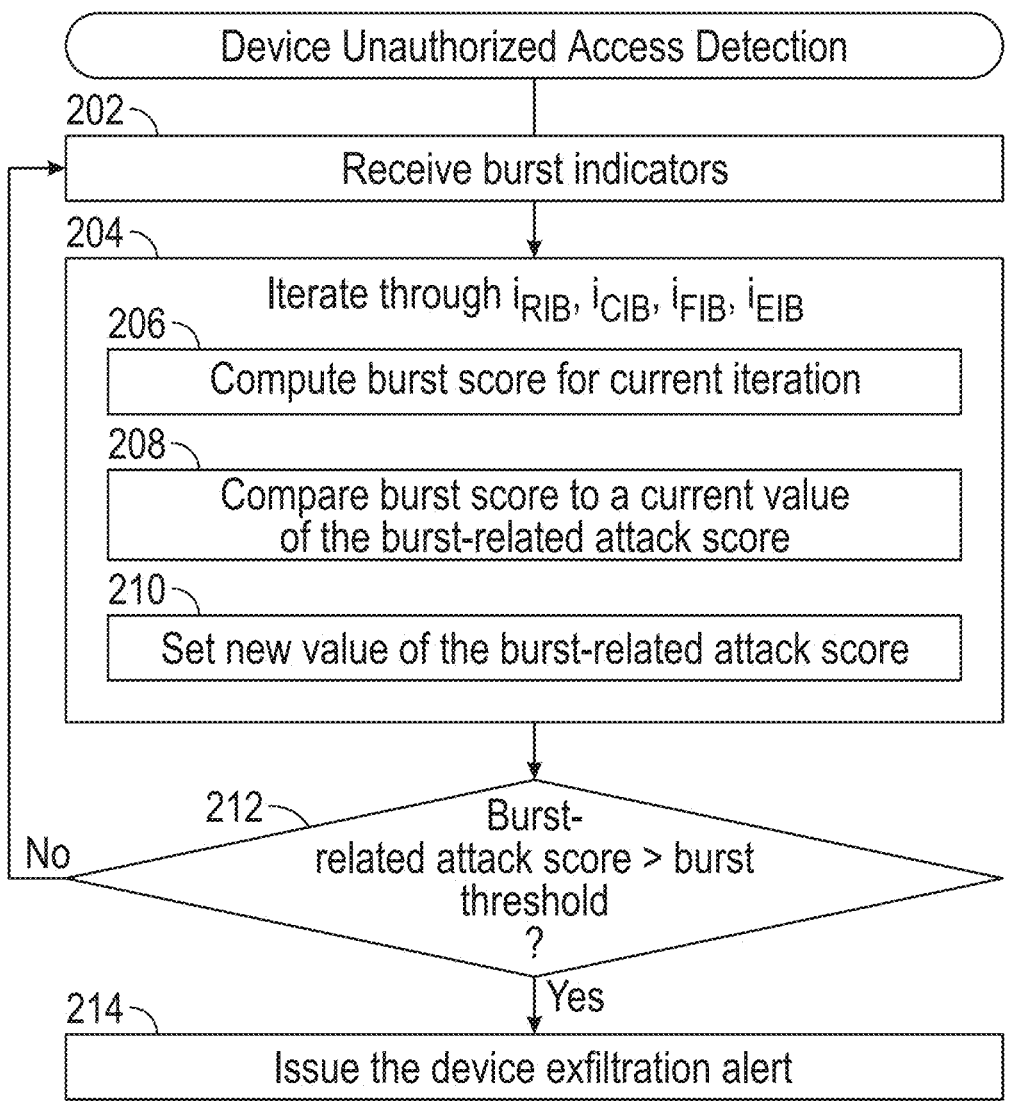
FIG. 2 is a flow diagram of a device unauthorized access detection process, according to some examples.

Referring to FIG. 2, the device unauthorized access detector 136 receives (at 202) burst indicators (134) from the burst indicator calculator 132. The device unauthorized access detector 136 iterates (at 204) through the time indexes $i_{RIB}, i_{CIB}; i_{FIB}$, and $i_{EIB}$ according to the ranges in Eq. 3. The time index $i_{RIB}$ is iterated from 1 to N−3, the time index $i_{CIB}$ is iterated from $i_{RIB}+1$ to N−2, the time index $i_{FIB}$ is iterated from $i_{CIB}+1$ to N−1, and the time index $i_{EIB}$ is iterated from $i_{FIB}+1$ to N. This follows the example data exfiltration pattern including a read I/O burst followed by a compression I/O burst, followed by a fragmentation I/O burst, and followed an encryption I/O burst. If a different data exfiltration pattern is used, then a different order of iterating through the time indexes of Eq. 3 would be performed.

In the current iteration (corresponding to specific time index values of $i_{RIB}$, $i_{CIB}$, $i_{FIB}$, and $i_{EIB}$), the device unauthorized access detector 136 computes (at 206) the value of Score BURST for the current iteration according to Eq. 1. The device unauthorized access detector 136 compares (at 208) the current value of $OutputScore_{BURST}$ to the value of $Score_{BURST}$ for the current time indexes $i_{RIB}$ $i_{CIB}$, $i_{FIB}$, and $i_{EIB}$. The device unauthorized access detector 136 sets (at 210) the new value of $OutputScore_{BURST}$ as the maximum of the current value of $OutputScore_{BURST}$ and the value of $Score_{BURST}$. After iterating through all the time indexes, a final value of $OutputScore_{BURST}$ is produced by the device unauthorized access detector 136.

The device unauthorized access detector 136 then compares the burst-related attack score $OutputScore_{BURST}$ to a burst threshold, which can be a value between 0 and 1. In some examples, the burst threshold may be a threshold value greater than 0.5 and less than 1, or a threshold value greater than 0.6 and less than 1, and so forth. If the device unauthorized access detector 136 determines (at 212) that the burst-related attack score $OutputScore_{BURST}$ does not exceed the burst threshold, the process of FIG. 2 returns to process new burst indicators.

If the device unauthorized access detector 136 determines (at 212) that the burst-related attack score $OutputScore_{BURST}$ exceeds the burst threshold, then the device unauthorized access detector 136 can make a determination that data exfiltration may potentially be occurring in the electronic device 102. In response, the device unauthorized access detector 136 can issue (at 214) the device exfiltration alert 152 to the attack management system 108. If $OutputScore_{BURST}$ does not exceed the burst threshold, then no alert is issued.

In alternative examples, a different formula for computing $OutputScore_{BURST}$ may be used, where instead of a higher value of $OutputScore_{BURST}$ indicating a higher likelihood of data exfiltration, a lower value of $OutputScore_{BURST}$ can indicate a higher likelihood of data exfiltration. In such alternative examples, the device unauthorized access detector 136 determines if the value of $OutputScore_{BURST}$ is less than the burst threshold, and if so, a potential data exfiltration is indicated.

In further examples, the unauthorized detection can be based on additional or alternative factors, including, for example, inspecting file names or detecting a known data harvesting tool on a storage medium.

Network Data Exfiltration Detection

The network unauthorized access detector 146 of the network exfiltration detection controller 116 of FIG. 1 checks for data transmission patterns and network behaviors that indicate data exfiltration is occurring. The data transmission patterns and network behaviors can include spikes in transmission of encrypted, small objects using irregular communications.

More specifically, in some examples, the network unauthorized access detector 146 uses the following network activity scores 144 provided by the network activity score calculator 142: ENA (an encryption activity score) (a higher score indicates when a burst in encrypted data is detected in the network 110, especially following data collection), SOA (a small object activity score) (a higher score indicates that a burst of smaller objects due to fragmentation has been detected); DRS (a data rate spike score) (a higher score indicates a spike in a data transfer rate that exceeds an expected rate threshold), and IRC (an irregular communication score) (a higher score indicates that data has been transmitted to one or more external target systems, over multiple communication channels, and/or using an unexpected communication protocol).

A potential data exfiltration is occurring if the foregoing activities (encryption, small object transfer, data rate spike, and irregular communication) are occurring in close time proximity to one another, as represented by a proximity factor ProximityFactor.

Within a network activity time interval (e.g., 30 minutes, one hour, or any other time interval), multiple network activity scores can be computed by the network activity score calculator 142. For example, a network activity score can be calculated every time window j, where j=1 to M, where M is an integer greater than or equal 2 and M represents a quantity of time windows over which network activity scores are computed. The length of a time window j for a network activity score may be the same length as or a different length from time window i for a burst indicator as discussed above. For example, if the time window j has a length of 4 minutes, and the network activity time interval is one hour, then M is set to 15.

Eq. 4 below is used by the network unauthorized access detector 146 in computing a network-related attack score $Score_{NETWORK}$.

$$Score_{NETWORK} = ((wENA \times MAX(ENA[1{:}M])) + (wSOA \times \newline MAX(SOA[1{:}M])) + (wDRS \times MAX(DRS[1{:}M])) + (wIRC \times \newline MAX(IRC[1{:}M]))) \times \text{Proximity Factor.} \quad \text{(Eq. 4)}$$

Eq. 4 includes a weight wENA for the encryption activity score (ENA), a weight wSOA for the small object activity score (SOA), a weight wDRS for the data rate spike score (DRS), and a weight wIRC for the irregular communication score (IRC). Each weight can be a value between 0 and 1 (or another value). The value assigned to each weight may be empirically set based on analysis of historical data for determining which of the burst indicators should be weighted more heavily over other burst indicators in detecting data exfiltration.

Eq. 4 also includes MAX(ENA[1:M]), which selects the maximum from among ENA[1] to ENA[M] computed by the network activity score calculator 142 in the network activity time interval; MAX(SOA[1:M]), which selects the maximum from among SOA[1] to SOA[M] computed by the network activity score calculator 142 in the network activity time interval; MAX(DRS[1:M]), which selects the maximum from among DRS[1] to DRS[M] computed by the network activity score calculator 142 in the network activity time interval, and MAX(IRC[1:M]), which selects the maximum from among IRC[1] to IRC[M] computed by the network activity score calculator 142 in the network activity time interval. In further examples, Eq. 4 can be modified to include additional or alternative factors.

In some examples, the network activity score calculator 142 can compute ENA[j] as a ratio of a quantity of encrypted I/O operations to a total quantity of I/O operations in time window j. The network activity score calculator 142 can compute SOA[j] as a ratio of a quantity of I/O operations involving small objects (less than a size threshold) to the total quantity of I/O operations in time window j.

The network activity score calculator 142 can set DRS[j] to 1 or 0 based on whether a data rate spike is observed in time window j. A data rate spike is present in time window j if the amount of data transferred in time window j is above a baseline data rate (e.g., an average data rate observed over a larger time interval) by greater than a standard deviation of data rates over the larger time window. If a data rate spike is detected in time window j, then DRS[j] is set to 1. If a data rate spike is not detected in time window j, then DRS[j] is set to 0. The variable j is a time index.

The network activity score calculator 142 can set IRC[j] to 1 or 0 based on whether an irregular communication is observed in time window j. An irregular communication is present in time window j if any one or more of the following are present: data is transmitted to one or more external target systems, data is transmitted over multiple communication channels to the one or more external target systems, or an unexpected communication protocol is used to transfer data.

The proximity factor ProximityFactor in Eq. 4 adjusts the network-related attack score $Score_{NETWORK}$ based on the number of parameters occurring within the specified timeframe. The network unauthorized access detector 146 calculates ProximityFactor as follows. The network unauthorized access detector 146 identifies the time index $j_{ENA}$ from among 1 to M in the network activity time interval at which ENA[$j_{ENA}$] is the maximum from among ENA[1] to ENA[M]. The network unauthorized access detector 146 identifies the time index $j_{SOA}$ from among 1 to M in the network activity time interval at which SOA[$j_{SOA}$] is the maximum from among SOA[1] to SOA[M]. The network unauthorized access detector 146 identifies the time index $j_{DRS}$ from among 1 to M in the network activity time interval at which DRS[$j_{DRS}$] is the maximum from among DRS[1] to DRS[M]. The network unauthorized access detector 146 identifies the time index $j_{IRC}$ from among 1 to M in the network activity time interval at which IRC[$j_{IRC}$] is the maximum from among IRC[1] to IRC[M].

The network unauthorized access detector 146 then takes the standard deviation of time indexes $j_{ENA}$, $j_{SOA}$, $j_{DRS}$, and $j_{SOA}$, to derive STD_MAXARGs. The proximity factor ProximityFactor is then computed according to Eq. 5.

$$ProximityFactor = \frac{1}{1 + STD\_MAXARGs}. \quad \text{(Eq. 5)}$$

In other examples, ProximityFactor can be computed in a different way, such as in a manner similar to Eq. 2 above.

If there are multiple instances of the maximum value of any of the foregoing network activity scores within the network activity time interval, the network unauthorized access detector 146 can find the time index from among the time indexes corresponding to the multiple instances of the maximum value of the network activity score that would lead to the highest value of ProximityFactor. For example, if there are three instances of the value 1 for DRS (data rate spike score), such as at time indexes $j_2$, $j_7$, and $j_{14}$ (note that 1 is the maximum value of DRS), then the network unauthorized access detector 146 can identify which of the time indexes $j_2$, $j_7$, and $j_{14}$ produces the highest value of ProximityFactor, and the network unauthorized access detector 146 uses the identified time index as $j_{DRS}$.

Figure 3:
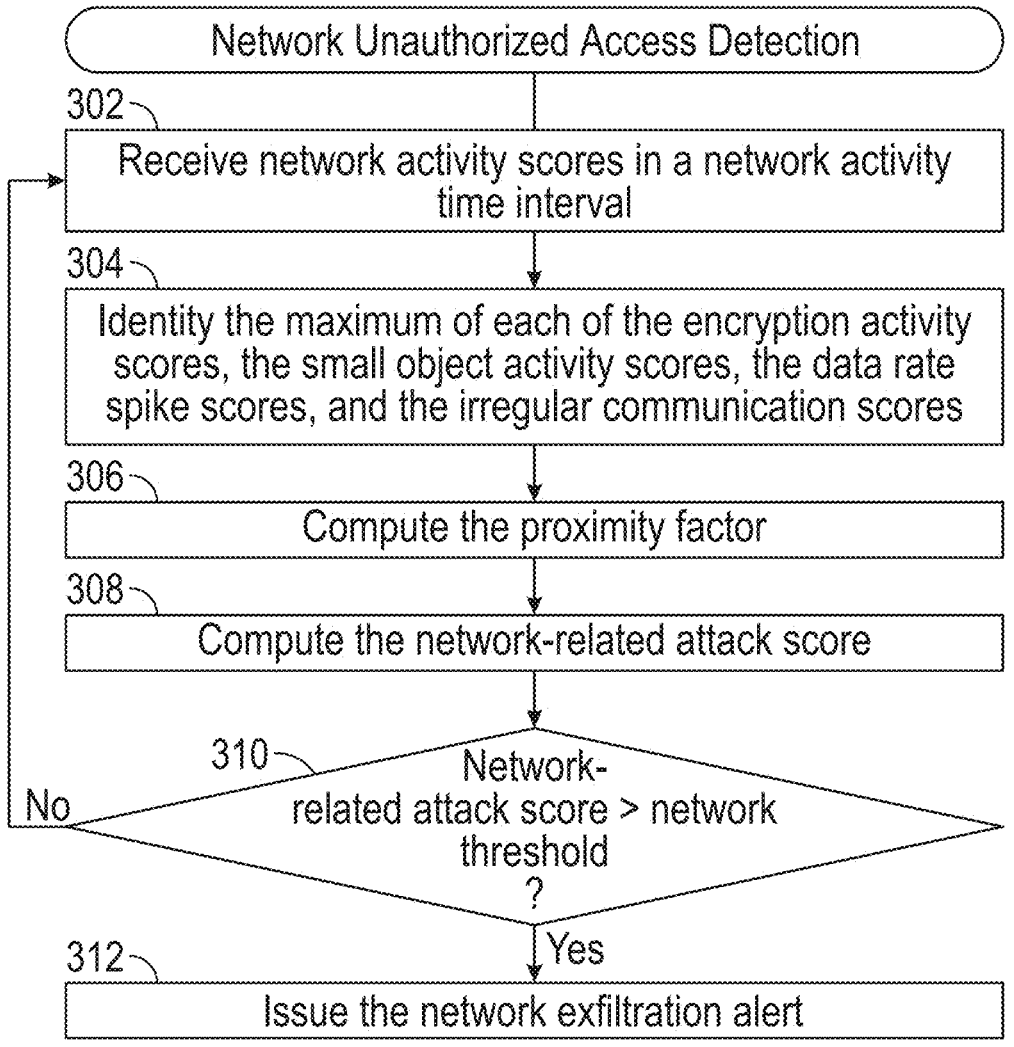
FIG. 3 is a flow diagram of a process of a network unauthorized access detection process, according to some examples.

Referring to FIG. 3, the network unauthorized access detector 146 receives (at 302), from the network activity score calculator 142, network activity scores in time windows 1 to M in a network activity time interval. The network unauthorized access detector 146 identifies (at 304) the maximum of each of the encryption activity scores, the small object activity scores, the data rate spike scores, and the irregular communication scores at time indexes 1 to M in the network activity time interval, which produces $ENA[j_{ENA}]$, $SOA[j_{SOA}]$, $DRS[j_{DRS}]$, and $IRC[j_{IRC}]$.

The network unauthorized access detector 146 computes (at 306) the proximity factor ProximityFactor according to Eq. 5 based on the time indexes of the maximum encryption activity score, the maximum small object activity score, the maximum data rate spike score, and the maximum irregular communication score. More specifically, the proximity factor ProximityFactor is computed based on the time indexes $j_{ENA}$, $j_{SOA}$, $j_{DRS}$, and $j_{SOA}$.

The network unauthorized access detector 146 computes (at 308) the network-related attack score $Score_{NETWORK}$ according to Eq. 4. The network unauthorized access detector 146 compares $Score_{NETWORK}$ to a network threshold. In some examples, the network threshold may be a threshold value greater than 0.5 and less than 1, or a threshold value greater than 0.6 and less than 1, and so forth. If the network unauthorized access detector 146 determines (at 310) that the network-related attack score $Score_{NETWORK}$ does not exceed the network threshold, the process of FIG. 3 returns to process more network activity scores.

If the network unauthorized access detector 146 determines (at 310) that the network-related attack score $Score_{NETWORK}$ exceeds the network threshold, then the network unauthorized access detector 146 can make a determination that data exfiltration may potentially be occurring over the network 110. In response, the network unauthorized access detector 146 can issue (at 312) the network exfiltration alert 154 to the attack management system 108. If $Score_{NETWORK}$ does not exceed the network threshold, then no alert is issued.

In alternative examples, a different formula for computing $Score_{NETWORK}$ may be used, where instead of a higher value of $Score_{NETWORK}$ indicating a higher likelihood of data exfiltration, a lower value of $Score_{NETWORK}$ can indicate a higher likelihood of data exfiltration. In such examples, the network unauthorized access detector 146 determines if the value of Score NETWORK is less than the network threshold, and if so, a potential data exfiltration is indicated.

Further Examples

Figure 4:
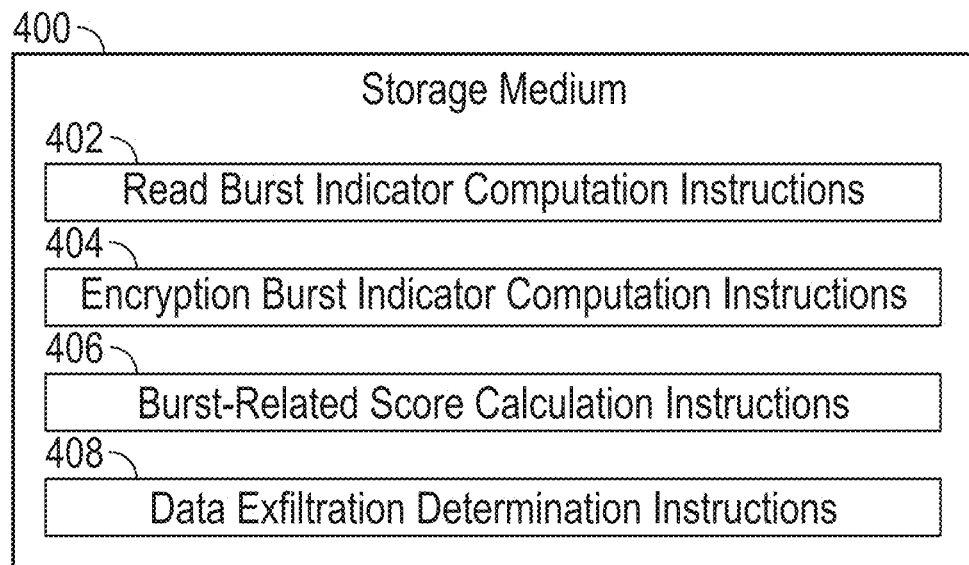
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks. The system can include the device exfiltration detection controller 114 of FIG. 1. The system may also include the network exfiltration detection controller 116 of FIG. 1.

The machine-readable instructions include read burst indicator computation instructions 402 to compute read burst indicators of read I/O bursts to a storage system at respective time points. An example of the storage system is the primary data store 122 of FIG. 1. The time points can include time windows (e.g., time window i) within a larger time interval. A read burst indicator can include RIB[i], for example.

The machine-readable instructions include encryption burst indicator computation instructions 404 to compute encryption burst indicators of encryption I/O bursts at the respective time points. An encryption burst indicator can include EIB[i], for example. In some examples, the machine-readable instructions may also compute other burst indicators, such as fragmentation burst indicators and compression burst indicators, for example.

The machine-readable instructions include burst-related score calculation instructions 406 to calculate a burst-related attack score based on the read burst indicators, the encryption burst indicators, and a distance factor that is based on a time distance between when a burst read I/O burst of the read I/O bursts occurred and when an encryption I/O burst of the encryption I/O bursts occurred. In some examples, the machine-readable instructions may calculate the burst-related score further based on additional or alternative burst indicators.

The machine-readable instructions include data exfiltration determination instructions 408 to determine whether an unauthorized access of a computing environment is occurring based on the burst-related attack score. For example, the machine-readable instructions can determine whether the burst-related attack score satisfies a criterion (e.g., whether the burst-related attack score exceeds a threshold or is less than the threshold). The computing environment can refer to a data center, a network environment, a cloud environment, or any other environment that is to be protected against an attack.

In some examples, the burst-related attack score is calculated based on relative time orders of the read burst indicators and the encryption burst indicators, such as relative time orders indicated by a data exfiltration pattern. For example, the data exfiltration pattern can include a read I/O burst, followed by a compression I/O burst, followed by a fragmentation I/O burst, and followed by an encryption I/O burst.

In some examples, the machine-readable instructions can detect transmission of data subject to encryption in the encryption I/O bursts to an external target system that is outside the computing environment. The determining of whether the unauthorized access of the computing environment is occurring is further based on detecting the transmission to the external target system.

In some examples, the machine-readable instructions can identify a communication protocol used to transmit data subject to encryption in the encryption I/O bursts. The determining of whether the unauthorized access of the computing environment is occurring is further based on the identified communication protocol.

In some examples, the machine-readable instructions can determine whether the identified communication protocol is part of a collection of expected communication protocols. The determining of whether the unauthorized access of the computing environment is occurring is further based on whether the identified communication protocol is part of the collection of expected communication protocols.

In some examples, the burst-related attack score is calculated based on aggregating a first read burst indicator at a first time point and a first encryption burst indicator at a second time point that is later than the first time point (e.g., according to Eqs. 1 and 3).

In some examples, a second encryption burst indicator at a third time point that is earlier than the first time point second is not aggregated with the first read burst indicator for calculating the score.

In some examples, the machine-readable instructions can compute fragmentation burst indicators of fragmentation I/O bursts at the respective time points. The burst-related attack score is calculated further based on relative time orders of the read burst indicators, the fragmentation burst indicators, and the encryption burst indicators.

In some examples, the machine-readable instructions can compute compression burst indicators of compression I/O bursts at the respective time points. The burst-related attack score is calculated further based on relative time orders of the read burst indicators, the compression burst indicators, and the encryption burst indicators.

In some examples, the machine-readable instructions can compute an encryption activity score representing transfers of encrypted objects over a network. An example of the encryption activity score is $ENA[j_{ENA}]$. The determining of whether the unauthorized access of the computing environment is occurring is further based on the encryption activity score.

In some examples, the machine-readable instructions can compute a small object activity score representing transfers of small objects with sizes less than a size threshold over the network. An example of the encryption activity score is $SOA[j_{SOA}]$. The determining of whether the unauthorized access of the computing environment is occurring is further based on the small object activity score.

In some examples, the machine-readable instructions can further compute a data rate spike score representing a data rate spike in transfers of objects over a network. An example of the encryption activity score is $DRS[j_{DRS}]$. The determining of whether the unauthorized access of the computing environment is occurring is further based on the data rate spike score.

In some examples, the machine-readable instructions can further compute an irregular communication score, such as $IRC[j_{IRC}]$. The determining of whether the unauthorized access of the computing environment is occurring is further based on the irregular communication score.

Figure 5:
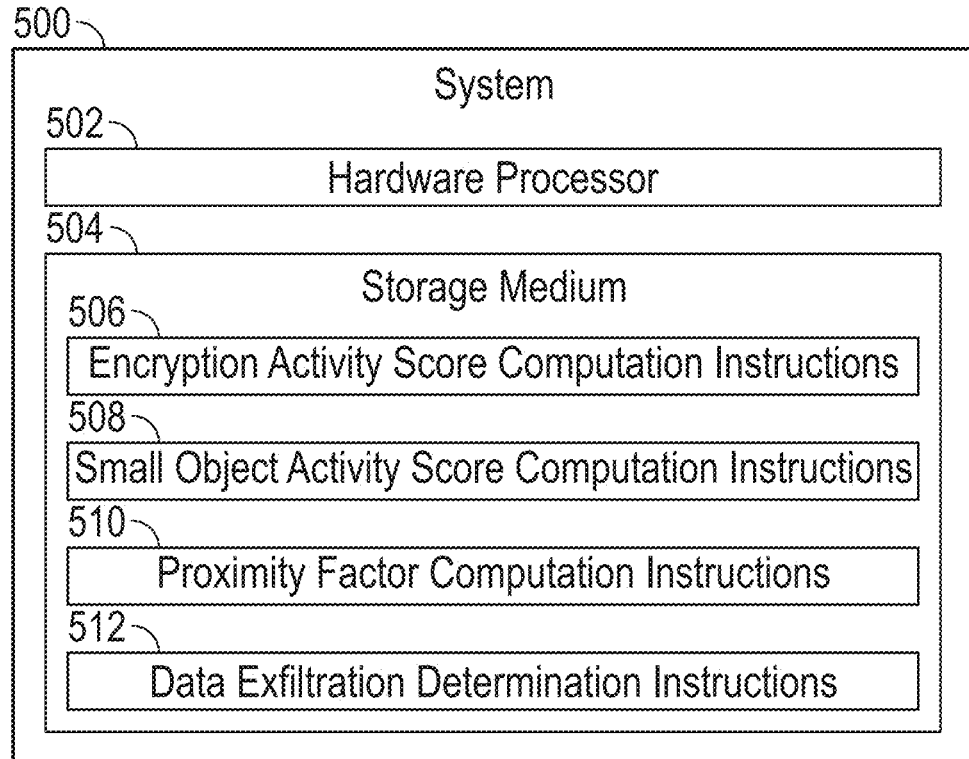
FIG. 5 is a block diagram of a system according to some examples.

FIG. 5 is a block diagram of a system 500 according to some examples. The system 500 can be implemented with one or more computers. The system 500 can include the network exfiltration detection controller 116 of FIG. 1. The system 500 may further include the device exfiltration detection controller 114 of FIG. 1.

The system 500 includes a hardware processor 502 (or multiple hardware processors). A hardware processor can include a microprocessor, a core of a multi-core microprocessor, a microcontroller, a programmable integrated circuit, a programmable gate array, or another hardware processing circuit.

The system 500 includes a storage medium 504 storing machine-readable instructions executable on the hardware processor 502 to perform various tasks. Machine-readable instructions executable on a hardware processor can refer to the instructions executable on a single hardware processor or the instructions executable on multiple hardware processors.

The machine-readable instructions in the storage medium 504 include encryption activity score computation instructions 506 to compute encryption activity scores representing transfers of encrypted objects over a network. An example of an encryption activity score is ENA[j].

The machine-readable instructions in the storage medium 504 include small object activity score computation instructions 508 to compute small object activity scores representing transfers of small objects with sizes less than a size threshold over the network. An example of a small object activity score is SOA[j]. In some examples, the machine-readable instructions can also compute data rate spike scores and irregular communication scores.

The machine-readable instructions in the storage medium 504 include proximity factor computation instructions 510 to compute a proximity factor based on a time proximity of the transfers of encrypted objects and the transfers of small objects. An example of the proximity factor is in Eq. 5.

The machine-readable instructions in the storage medium 504 include data exfiltration determination instructions 512 to determine, based on the encryption activity scores, the small object activity scores, and the proximity factor, whether an unauthorized access of a computing environment is occurring.

In some examples, an irregular communication score can be based on one or more of: detecting transmission of the encrypted objects and the small objects to an external target system outside the computing environment, or identifying an unexpected communication protocol used to transmit the encrypted objects and the small objects.

Figure 6:
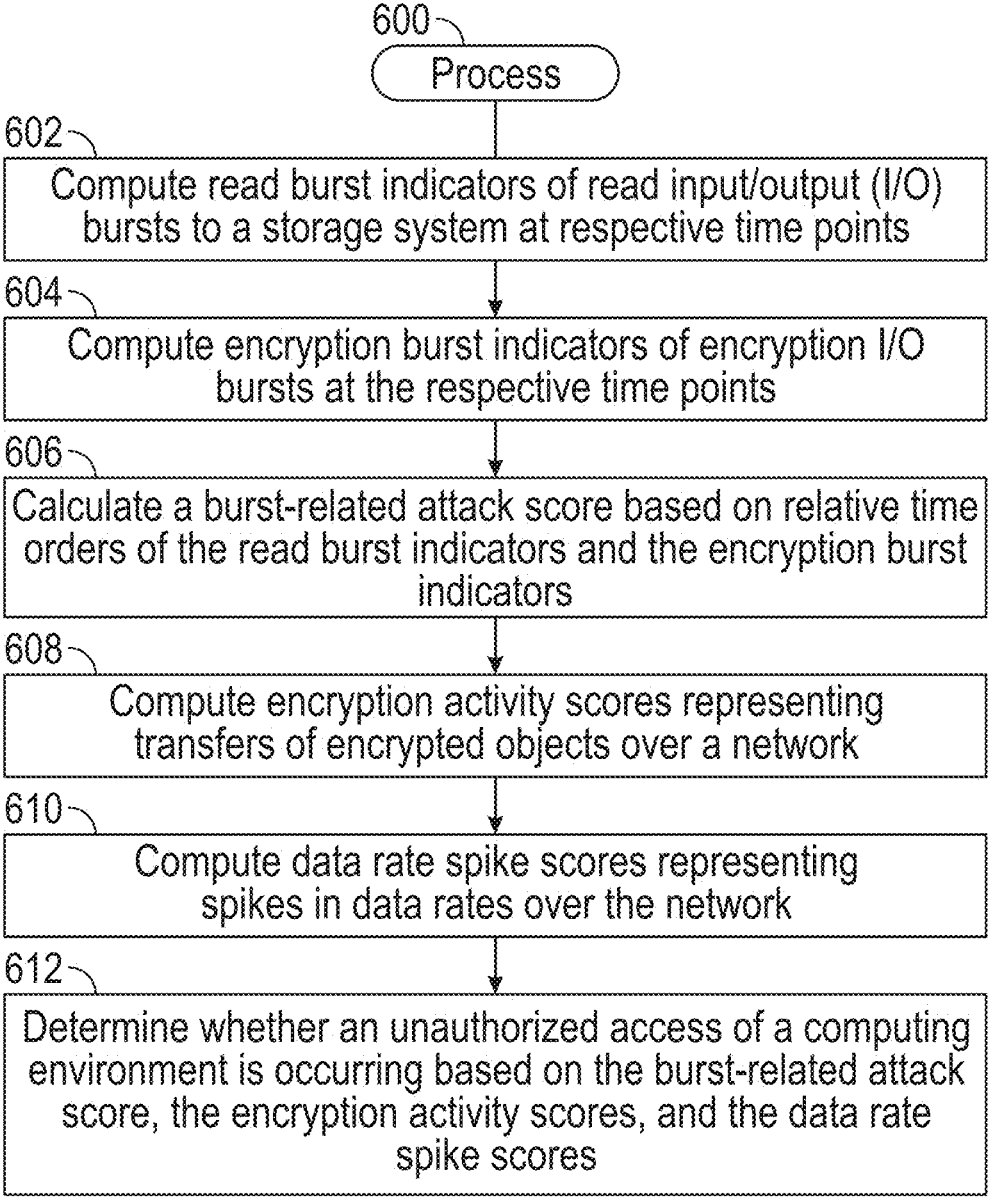
FIG. 6 is a flow diagram of a process according to some examples.

FIG. 6 is a flow diagram of a process 600, which may be performed by the device exfiltration detection controller 114 and the network exfiltration detection controller 116 of FIG. 1, for example.

The process 600 includes computing (at 602) read burst indicators of read I/O bursts to a storage system at respective time points. An example of a read burst indicator is RIB[j].

The process 600 includes computing (at 604) encryption burst indicators of encryption I/O bursts at the respective time points. An example of an encryption burst indicator is EIB[i].

The process 600 includes calculating (at 606) a burst-related attack score based on relative time orders of the read burst indicators and the encryption burst. An example of calculating the burst-related attack score is according to Eqs. 1 and 3.

The process 600 includes computing (at 608) encryption activity scores representing transfers of encrypted objects over a network. An example of an encryption activity score is ENA[j].

The process 600 includes computing (at 610) data rate spike scores representing spikes in data rates over the network. An example of a data rate spike score is DRS[j].

The process 600 includes determining (at 612) whether an unauthorized access of a computing environment is occurring based on the burst-related attack score, the encryption activity scores, and the data rate spike scores.

An "electronic device" can refer to any or some combination of the following: a desktop computer, a notebook computer, a tablet computer, a smartphone, a game appliance, a vehicle, a household appliance, or any other type of electronic device.

A "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EE-PROM), or a flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   compute read burst indicators of read input/output (I/O) bursts to a storage system at respective time points;
   compute encryption burst indicators of encryption I/O bursts at the respective time points;
   calculate a score based on the read burst indicators, the encryption burst indicators, and a distance factor that is based on a time distance between when a read I/O burst of the read I/O bursts occurred and when an encryption I/O burst of the encryption I/O bursts occurred; and
   determine whether an unauthorized access of a computing environment is occurring based on the score.

2. The non-transitory machine-readable storage medium of claim 1, wherein the instructions upon execution cause the system to:
   compute fragmentation burst indicators of fragmentation I/O bursts at the respective time points,
   wherein the score is calculated further based on the fragmentation burst indicators.

3. The non-transitory machine-readable storage medium of claim 1, wherein the instructions upon execution cause the system to:

compute compression burst indicators of compression I/O bursts at the respective time points,
   wherein the score is calculated further based on the compression burst indicators.

4. The non-transitory machine-readable storage medium of claim 1, wherein the instructions upon execution cause the system to:
   detect transmission of data subject to encryption in the encryption I/O bursts to an external target system that is outside the computing environment,
   wherein the determining of whether the unauthorized access of the computing environment is occurring is further based on detecting the transmission to the external target system.

5. The non-transitory machine-readable storage medium of claim 1, wherein the instructions upon execution cause the system to:
   identify a communication protocol used to transmit data subject to encryption in the encryption I/O bursts,
   wherein the determining of whether the unauthorized access of the computing environment is occurring is further based on the identified communication protocol.

6. The non-transitory machine-readable storage medium of claim 5, wherein the instructions upon execution cause the system to:
   determine whether the identified communication protocol is part of a collection of expected communication protocols,
   wherein the determining of whether the unauthorized access of the computing environment is occurring is further based on whether the identified communication protocol is part of the collection of expected communication protocols.

7. The non-transitory machine-readable storage medium of claim 1, wherein the score is calculated based on relative time orders of the read burst indicators and the encryption burst indicators.

8. The non-transitory machine-readable storage medium of claim 7, wherein the score is calculated based on aggregating a first read burst indicator at a first time point and a first encryption burst indicator at a second time point that is later than the first time point.

9. The non-transitory machine-readable storage medium of claim 8, wherein a second encryption burst indicator at a third time point that is earlier than the first time point second is not aggregated with the first read burst indicator for calculating the score.

10. The non-transitory machine-readable storage medium of claim 7, wherein the instructions upon execution cause the system to:
   compute fragmentation burst indicators of fragmentation I/O bursts at the respective time points,
   wherein the score is calculated further based on relative time orders of the read burst indicators, the fragmentation burst indicators, and the encryption burst indicators.

11. The non-transitory machine-readable storage medium of claim 7, wherein the instructions upon execution cause the system to:
   compute compression burst indicators of compression I/O bursts at the respective time points,
   wherein the score is calculated further based on relative time orders of the read burst indicators, the compression burst indicators, and the encryption burst indicators.

12. The non-transitory machine-readable storage medium of claim 1, wherein the instructions upon execution cause the system to:

compute an encryption activity score representing transfers of encrypted objects over a network, wherein the determining of whether the unauthorized access of the computing environment is occurring is further based on the encryption activity score.

13. The non-transitory machine-readable storage medium of claim 1, wherein the instructions upon execution cause the system to:

compute a small object activity score representing transfers of small objects with sizes less than a size threshold over a network, wherein the determining of whether the unauthorized access of the computing environment is occurring is further based on the small object activity score.

14. The non-transitory machine-readable storage medium of claim 1, wherein the instructions upon execution cause the system to:

compute a data rate spike score representing a data rate spike in transfers of objects over a network, wherein the determining of whether the unauthorized access of the computing environment is occurring is further based on the data rate spike score.

15. A system comprising:

a hardware processor; and a non-transitory storage medium storing instructions executable on the hardware processor to:

compute encryption activity scores representing transfers of encrypted objects over a network, compute small object activity scores representing transfers of small objects with sizes less than a size threshold over the network;

compute a proximity factor based on a time proximity of the transfers of encrypted objects and the transfers of small objects; and determine, based on the encryption activity scores, the small object activity scores, and the proximity factor, whether an unauthorized access of a computing environment is occurring.

16. The system of claim 15, wherein the instructions are executable on the hardware processor to:

compute a data rate spike score representing a data rate spike in transfers of objects over the network, wherein the proximity factor is computed based on a time proximity of the transfers of encrypted objects, the transfers of small objects, and the data rate spike, and wherein the determining of whether the unauthorized access of the computing environment is occurring is further based on the data rate spike score.

17. The system of claim 15, wherein the instructions are executable on the hardware processor to:

compute an irregular communication score based on one or more of:

detecting transmission of the encrypted objects and the small objects to an external target system outside the computing environment, or identifying an unexpected communication protocol used to transmit the encrypted objects and the small objects, wherein the determining of whether the unauthorized access of the computing environment is occurring is further based on the irregular communication score.

18. The system of claim 15, wherein the proximity factor is based on a standard deviation of a time index of a maximum encryption activity score of the encryption activity scores and a time index of a maximum small object activity score of the small object activity scores in a time interval.

19. A method comprising:

computing, by a system comprising a hardware processor, read burst indicators of read input/output (I/O) bursts to a storage system at respective time points;

computing, by the system, encryption burst indicators of encryption I/O bursts at the respective time points;

calculating, by the system, a burst-related attack score based on relative time orders of the read burst indicators and the encryption burst indicators;

computing, by the system, encryption activity scores representing transfers of encrypted objects over a network, computing, by the system, data rate spike scores representing spikes in data rates over the network;

determining, by the system, whether an unauthorized access of a computing environment is occurring based on the burst-related attack score, the encryption activity scores, and the data rate spike scores.

20. The method of claim 19, comprising:

computing, by the system, a network-related attack score based on the encryption activity scores, the data rate spike scores, and a proximity factor based on a time proximity of the transfers of encrypted objects and transfers of small objects, wherein the determining of whether the unauthorized access of the computing environment is occurring is based on the burst-related attack score and the network-related attack score.

* * * * *